Patented Dec. 7, 1937

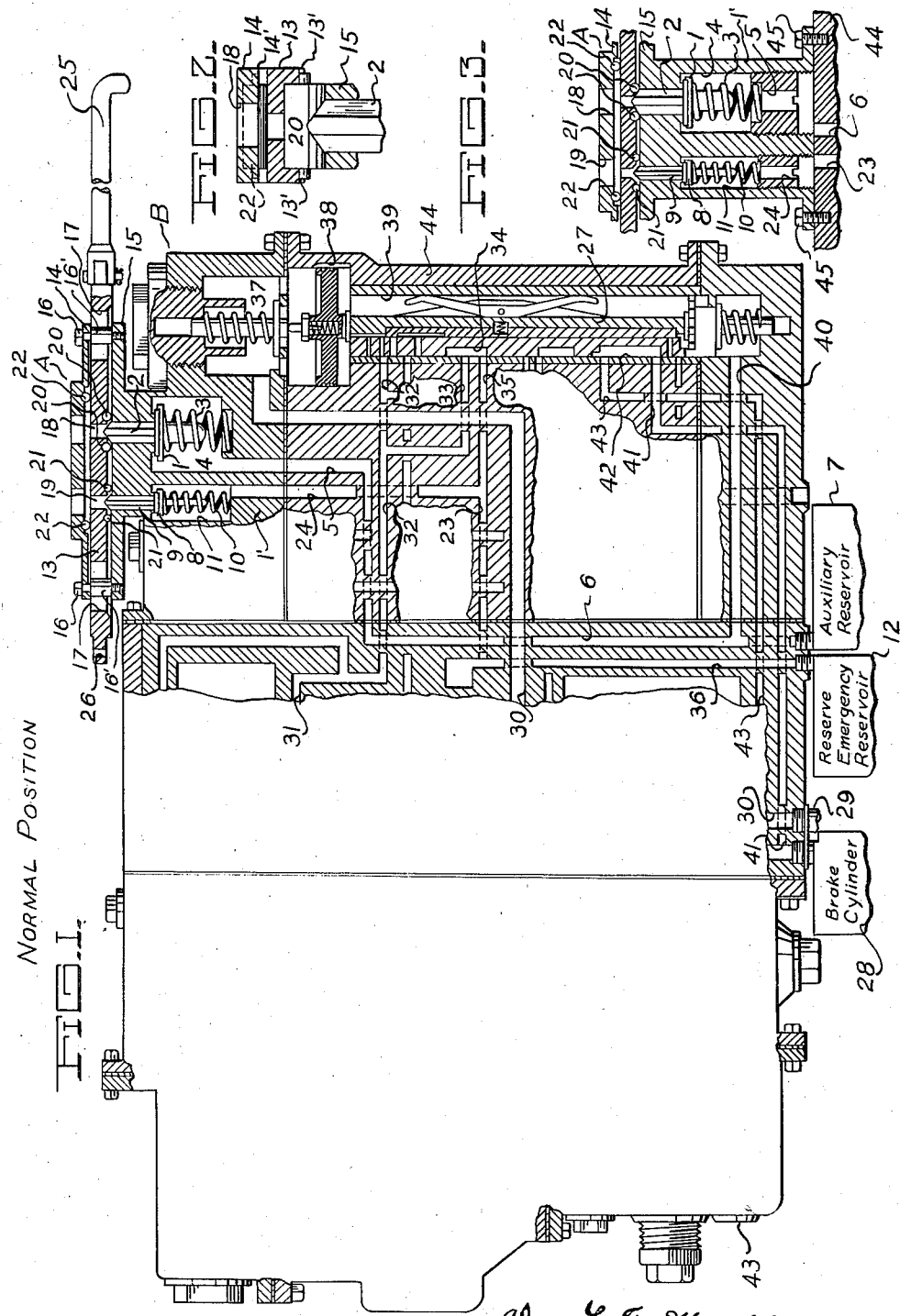

2,101,708

UNITED STATES PATENT OFFICE 2,101,708

AIR BRAKE MECHANISM

Alva L. Goodknight, Fort Worth, Tex.

Application September 18, 1937, Serial No. 164,429

9 Claims. (Cl. 303—80)

This invention relates to air brake mechanism of the general type described in my Letters Patent No. 2,007,787, and No. 2,007,788, issued to me April 20th, 1937, and more particularly to manual bleed-release valves therefor, my present invention is an improvement on the air brake reservoir manual bleed-release valve device attachment to pressure reservoirs and mechanism therefor, upon railway cars and engines, so that trainmen may with but one handle either bleed-release an individual brake that fails to release in the usual manner, or empty both the auxiliary reservoir and reserve emergency reservoir of pressures when found necessary for shunting cars, or similar operations without any liability of the valves sticking open by frictional or gummy surfaces, after the handle is released by the operator.

The principal object of the invention is to provide a manually slidable pull or push anti-friction cam plate equipped with a plurality of rollers or ball bearings for rolling open one or two reservoir manual bleed-release valves which may be operated from the air brake mechanism with handles extending to both sides of the car.

A further object of the invention is to provide guides and flanged means for holding the rollers or ball bearings in assembly whereby frictional and gummy surface resistance to the positive automatic closure of the valves is thereby avoided after the handle has been released by the operator.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of the specification;

The Figure 1 is a diagrammatic sectional side view of my duplex reservoir manual bleed-release valve device designated portion A, and attached to my other relative air brake mechanism designated portion B, and constructed in accordance with the invention which shows the parts in normal position and the other portion of the relative air brake valve mechanism partly in section and partly in an outline.

Figure 2 is broken diagrammatic sectional end view of the duplex reservoir manually slidable bleed-release valve device, showing the guides 14, 15 and the flanges 13' holding the rollers 20 in operating position, also the rollers 21 and the dotted line rollers 22 are likewise held in the same manner with flanges 13' and 14'.

Figure 3 is a broken view (similar to Figure 1) of a modified form of the duplex reservoir manual bleed-release valve device in portion A, which provides a more economical and convenient form of valve device to install and also interchange with other types of similar valve devices by attaching same to the body 44 with the stud bolts 45.

Referring now to the drawing, the invention's mechanism is shown to comprise a bleed-release valve device in a body 1' of the portion A, all the other parts of the relative mechanism are substantially the same in construction and operation as described in the above referred to Patent No. 2,007,788, and in carrying out the present invention, this bleed-release valve device for the auxiliary reservoir and the reserve-emergency reservoir is illustrated in Figures 1, 2 and 3.

As shown in the Figure 1 of the drawing, the triple valve service portion B, comprises a service piston assembly 27, an auxiliary reservoir 7, a reserve-emergency reservoir 12, a brake cylinder 28, and a brake pipe passage 30 which is connected to the brake pipe 29.

The auxiliary reservoir 7 is charged from the brake pipe 29, through the passage 30, chamber 37, port 38, chamber 39, and passage 40, also from the brake pipe passages 30, 31 and 32, the reserve-emergency reservoir 12 is charged from the auxiliary reservoir 7 through passage 40, chamber 39, passages 32, 33, cavity 34, passages 35, 23 and 36; also from the brake pipe 29 through passages 30, 31 and 32.

Referring now to the reservoir manually slidable duplex bleed-release valve device in portion A for venting pressure from the auxiliary reservoir and the reserve-emergency reservoir into the atmosphere, Figure 1, designates a valve having a cruciform stem 2, the wings of which form air passages between them. The stem terminates in a beveled pointed tip. A spring 3 is seated in a chamber 4, in a body 1', and tends constantly to hold the valve closed. The chamber communicates with a passage 5 which in turn communicates with a passage 6 that leads to the auxiliary reservoir 7.

A similar valve 8 is provided with a cruciform stem 9 having air passages between its wings, and the valve is held closed by a spring 10, seated in the body 1' in a chamber 11, which communicates with the reserve-emergency reservoir 12, through passages 24, 23 and 36.

For manually opening the valves 1 and 8, a cam plate 13 provided with flange wings 13' for holding the cam rollers in operation position, is slidably mounted between the top flanged guide 14 and the bottom guide 15 exteriorly of the valves and is limited in sliding movement in either direction by stop bolts 16 that pass through the cylindrical spacing members 16', which in turn pass through slots 17 in the sliding plate 13 and are terminally connected to the guides. The top guide 14 is provided with flanged wings 14' on both sides that project downwardly at each end of the rollers 22 to hold them in operating position, the bottom guide 15 is formed flat or beveled to permit any foreign matter to blow off the roller seats (see Figs. 1 and 2). The sliding plate 13 is also provided with ports 18 and 19 which overlie respectively the air passages of the valve stems 2 and 9 and vent these passages to the atmosphere.

A pair of cam rollers 20 are mounted in the lower face of the sliding flanged cam plate, which normally engage the low ends of the beveled pointed tip end of the valve stem 2 (see Figs. 1 and 2). Manual pull or push movement of the plate 13 through a portion of its stroke in either direction will cause one of the pair of cam rollers 20 to roll and tread upon the inclined cam edges of the beveled pointed tip end of the valve stem 2 and thus depress the stem to open the valve, thereby venting the auxiliary reservoir 7 through the passages 6 and 5, chamber 4, air spaces in the valve stem 2, and port 18 to the atmosphere.

Likewise a pair of cam rollers 21 are arranged in the space of the plate 13 close to, but not touching, the beveled pointed tip end of the valve stem 9. During movement of the plate 13 to the complete limit of its stroke in either direction, one of the rollers 21 will roll and tread upon the inclined cam faces of the valve stem 9 and thus depress the valve stem to open the valve 8 while at the same time the other valve 1, is being simultaneously held open as above described by its associated roller 20. Thus the reserve-emergency reservoir 12 will be simultaneously vented to the atmosphere through the passages 36, 23 and 24, chamber 11, air spaces in the cruciform stem 9 and port 19 to the atmosphere.

It will be further understood that a reduction of brake pipe pressure to cause the quick service, service and full service applications will force the triple valve device to automatically connect the auxiliary reservoir with the brake cylinder through the usual service port 41, then after the release is accomplished, if any brake fails to release, then the reservoir manual bleed-release valve device may be manually operated to vent the auxiliary reservoir pressure to the atmosphere to bleed the brake cylinder pressure through the said auxiliary reservoir, which will develop a preponderance of brake pipe pressure over that of the auxiliary reservoir; this will force the triple valve device to automatically assume normal release position and thus release the brake through port 41 cavity 42 and port 43 to the atmosphere, then the reservoir bleed-release valve device handle is released to permit the valve to close into normal position and thus avoid any further waste of the reservoir pressure.

Also during the emergency application when all brake pipe pressure is exhausted to the atmosphere in any manner the triple valve assembly device 27 will be forced by the preponderance of auxiliary reservoir pressure to assume full application position which establishes the usual connection between the auxiliary reservoir and brake cylinder, then when the reservoir bleed-release valve device is manually rolled open to vent the auxiliary and reserve emergency reservoirs, the brake cylinder pressure will bleed into the auxiliary reservoir, whereupon the said bleed-release valve device will vent all of the pressure of both reservoirs into the atmosphere and thus completely release the brake, then when the operator releases the rod handle the springs 3 and 10, will cause the beveled ends of the valve cruciform stems 2 and 9 to force the anti-friction cam rollers 20 and 21 to automatically roll and carry the cam plate 13 back to normal position, which permits the valves 1 and 8 to positively close with only slight frictional resistance.

To eliminate or reduce friction to a minimum, the plate 13 against the guide flanges 14 and 15, anti-friction rollers 22 are mounted between wing flanges 14' and the opposed surfaces of the plate and guides. To attach rods 25 to the said plate for manipulating the plates from the sides of the cars, openings 26 are formed in the ends of the said plate (see Figure 1).

It is a well known fact that the tilting type of reservoir manual release valves will sometimes stick open after pulled or pushed open by an operator to bleed the pressure from the reservoir to release a stuck brake, the valve that fails to close after its handle rod is released by the operator will leak the pressure from the reservoir and thus render the brake impotent to function, which is due to the difficulty of frictional and gummy, dirty surfaces of the device.

My reservoir manual duplex bleed-release valve for rolling the valves open is an improvement over the tilting type of reservoir bleed-release valves, for the reason that it eliminates all frictional surfaces of the device that would become gummy and dirty by employing a slidable cam plate on anti-friction cam rollers that partly roll and tread the bevelled tip ends of the bleed-release valves when the rod handle and its plate is pulled or pushed to compress the springs to roll open one or both of said valves to bleed the reservoirs to release a stuck brake. Then when the rod handle and its plate is released by the operator, the rollers and their plate are automatically forced to roll back again by the bevelled tip ends of the valve stem with the expansion of their springs to normal closed position without gummy or frictional resistance or any liability of the valves sticking open to leak the pressure from the reservoir into the atmosphere and thus render the brake impotent to function and therefore inoperative when needed.

Since the operation of the parts has been described as the description of the parts progressed, it is thought that the construction and operation of my invention will be fully understood without further explanation.

What is claimed is:

1. In an air brake mechanism, in combination, a brake pipe, a brake cylinder, and an auxiliary reservoir adapted to be charged with fluid under pressure from the said brake pipe to effect a service application of the brakes, a reserve-emergency reservoir adapted to be charged from the said auxiliary reservoir and fluid under pressure from the said brake pipe to effect the emergency application, duplex reservoir pressure bleed-release valves for venting both reservoirs to the atmosphere, a manually slidable anti-friction cam plate and anti-friction cam means between the said valves and the said plate for rolling open the said valves in a predetermined sequence when the said plate is actuated, and means for holding the anti-friction means in operation assembly.

2. In an air brake mechanism, in combination, a brake pipe, a brake cylinder, and an auxiliary reservoir adapted to be charged with fluid under pressure from the said brake pipe to effect a service application of the brakes, a reserve-emergency reservoir adapted to be charged from the said auxiliary reservoir and fluid under pressure from the said brake pipe to effect the emergency application, duplex reservoir bleed-release valves adapted for venting pressure from both reservoirs to the atmosphere to relieve unreleased brakes, a manually slidable flanged plate and cam rollers carried by the said plate and so spaced apart as to first roll open the auxiliary reservoir valve when the said plate is moved a portion of its stroke and then roll open the reserve-emergency valve while simultaneously holding open the auxiliary reservoir valve when the said plate is moved through its full stroke, and means for a positive automatic closure of the said bleed-release valves.

3. In an air brake mechanism, in combination, a brake pipe, a brake cylinder, and an auxiliary reservoir adapted to be charged with fluid under pressure from the brake pipe to effect a service application of the brakes, a reserve-emergency reservoir adapted to be charged from the said auxiliary reservoir and fluid under pressure from the said brake pipe to effect the emergency application, duplex pressure bleed valves adapted for venting pressure from both reservoirs to the atmosphere to relieve unreleased brakes, a manually slidable flanged plate and anti-friction cam rollers carried by the plate and so spaced apart as to first roll open the auxiliary reservoir valve when the plate is moved a portion of its stroke and then roll open the reserve-emergency reservoir valve while simultaneously holding open the auxiliary reservoir valve when the plate is moved through its full stroke, and guide flange means for holding the anti-friction bearings in assembly.

4. In an air brake mechanism, in combination, a brake pipe, a brake cylinder, and an auxiliary reservoir adapted to be charged with fluid pressure from the brake pipe to effect a service application of the brakes, a reserve-emergency reservoir adapted to be charged from the said auxiliary reservoir and fluid under pressure from the said brake pipe to effect the emergency application, duplex reservoir pressure bleed-release valves and springs for holding said valves closed in normal position, said bleed-release valves adapted for venting pressure from both reservoirs and the brake cylinder to the atmosphere while the brake is applied to relieve unreleased brakes, a manually slidable plate and a plurality of rollers carried by the plate and so spaced apart as to first roll open the auxiliary reservoir valve when the plate is moved forward or backward a portion of its stroke and then roll open the reserve-emergency reservoir valve while simultaneously holding open the auxiliary reservoir valve when the plate is moved through its full stroke in the same direction and guide flange means for holding the rollers in assembly.

5. In an air brake mechanism, in combination, a brake pipe, a brake cylinder, and an auxiliary reservoir adapted to be charged with fluid under pressure from the brake pipe to effect a service application of the brakes, a reserve-emergency reservoir adapted to be charged from the said auxiliary reservoir and fluid under pressure from the said brake pipe to effect the emergency application, duplex reservoir pressure bleed-release valves, adapted for venting pressure from both reservoirs to the atmosphere to relieve unreleased brakes, a valve body attachment provided with a lower guide, and an upper flanged guide, a manually slidable flanged and slotted plate provided with handle rods attached thereto and secured together with stop bolts and cylindrical spacing members between the guides, a plurality of rollers carried by the said plate and so spaced apart as to first roll open the auxiliary reservoir valve when the said plate is moved forward or backward a portion of its stroke and then roll open the reserve-emergency reservoir valve while simultaneously holding open the auxiliary reservoir valve when the plate is moved through its full stroke in the same direction; said auxiliary reservoir pressure bleed-release valve also provided with a chamber and a passage leading therefrom to the said auxiliary reservoir, the said reserve-emergency reservoir pressure bleed-release valve also provided with a chamber and a passage leading therefrom to the said reserve-emergency reservoir, and ported means for venting pressure separately from each said valve device to the atmosphere.

6. In an air brake mechanism, in combination, a brake pipe, a brake cylinder, and an auxiliary reservoir adapted to be charged from the brake pipe with fluid under pressure to effect a service application of the brakes, a reserve-emergency reservoir adapted to be charged from the said auxiliary reservoir and fluid under pressure from the said brake pipe to effect the emergency application, reservoir bleed-release valves adapted for venting pressure from both reservoirs to the atmosphere to relieve unreleased brakes, a valve body casing provided with spacing members between a lower guide and an upper guide, and a manually slidable plate therebetween, a plurality of rollers carried by the said plate and so spaced apart as to first roll open the auxiliary reservoir valve when the plate is moved forward or backward a portion of its stroke and then roll open the reserve-emergency reservoir valve while simultaneously holding open the auxiliary reservoir valve when the plate is moved through its full stroke in the same direction, and means for automatically placing both valves and the anti-friction plate in normal position.

7. In an air brake mechanism, in combination, a brake pipe, a brake cylinder, and an auxiliary reservoir adapted to be charged with fluid pressure from the brake pipe to effect a service application of the brakes, a reserve-emergency reservoir adapted to be charged with pressure from the said auxiliary reservoir and fluid under pressure from the said brake pipe, to effect the emergency application, reservoir bleed-release valves adapted for venting pressure from both reservoirs to the atmosphere with but one handle to relieve unreleased brakes, or to empty both reservoirs, a lower guide and an upper guide provided with a manually slidable cam plate therebetween, a plurality of rollers spaced apart between the upper guide and the plate and a plurality of rollers spaced apart between the lower guide and plate and carried by the under face of the said plate to minimize frictional resistance and so spaced apart as to first roll open the auxiliary reservoir valve when the plate is moved a portion of its stroke forward or backward and then roll open the reserve-emergency reservoir valve while simultaneously holding open the auxiliary reservoir valve when the plate is moved its full stroke in the same direction, and means for automatically placing the reservoir bleed-release valve anti-friction device in normal release position immediately following each manual actuation.

8. In an air brake mechanism, in combination, a brake pipe, a brake cylinder, and an auxiliary reservoir adapted to be charged with fluid under pressure from the said brake pipe to effect a service application of the brakes, a reserve-emergency reservoir adapted to be charged from the said auxiliary reservoir and fluid under pressure from the said brake pipe to effect the emergency application, a duplex reservoir pressure bleed-release valve device, adapted for opening and closing the said valves for venting both reservoirs to the atmosphere to relieve unreleased brakes, a manually slidable plate and anti-friction rollers carried by the plate between a lower guide and the said plate and so spaced apart as to first roll open the auxiliary reservoir valve when the plate is moved a portion of its stroke in either direction and then roll open the reserve-emergency reservoir valve while simultaneously holding open the auxiliary reservoir valve when the plate is moved through its full stroke, and automatic anti-friction means for placing the said bleed-release valves in normal position.

9. In an air brake mechanism, in combination, a brake pipe, a brake cylinder, and an auxiliary reservoir adapted to be charged with fluid under pressure from the said brake pipe to effect a service application of the brakes, a reserve-emergency reservoir adapted to be charged from the said auxiliary reservoir and fluid under pressure from the said brake pipe to effect the emergency application, a reservoir pressure bleed-release valve device provided with a chamber and a port therefor, said port leading from said chamber to said reservoir and adapted for venting the pressure to the atmosphere to relieve unreleased brakes, a manually slidable anti-friction plate and cam rollers carried by the said plate and so spaced apart as to roll open the valve when the said plate is moved in either direction.

ALVA L. GOODKNIGHT.